Nov. 5, 1935.    H. W. MERKEL    2,019,989
CORD TAKE-UP AND CONTROL APPARATUS
Filed Aug. 2, 1933    2 Sheets-Sheet 1

INVENTOR.
Henry W. Merkel
BY
ATTORNEYS

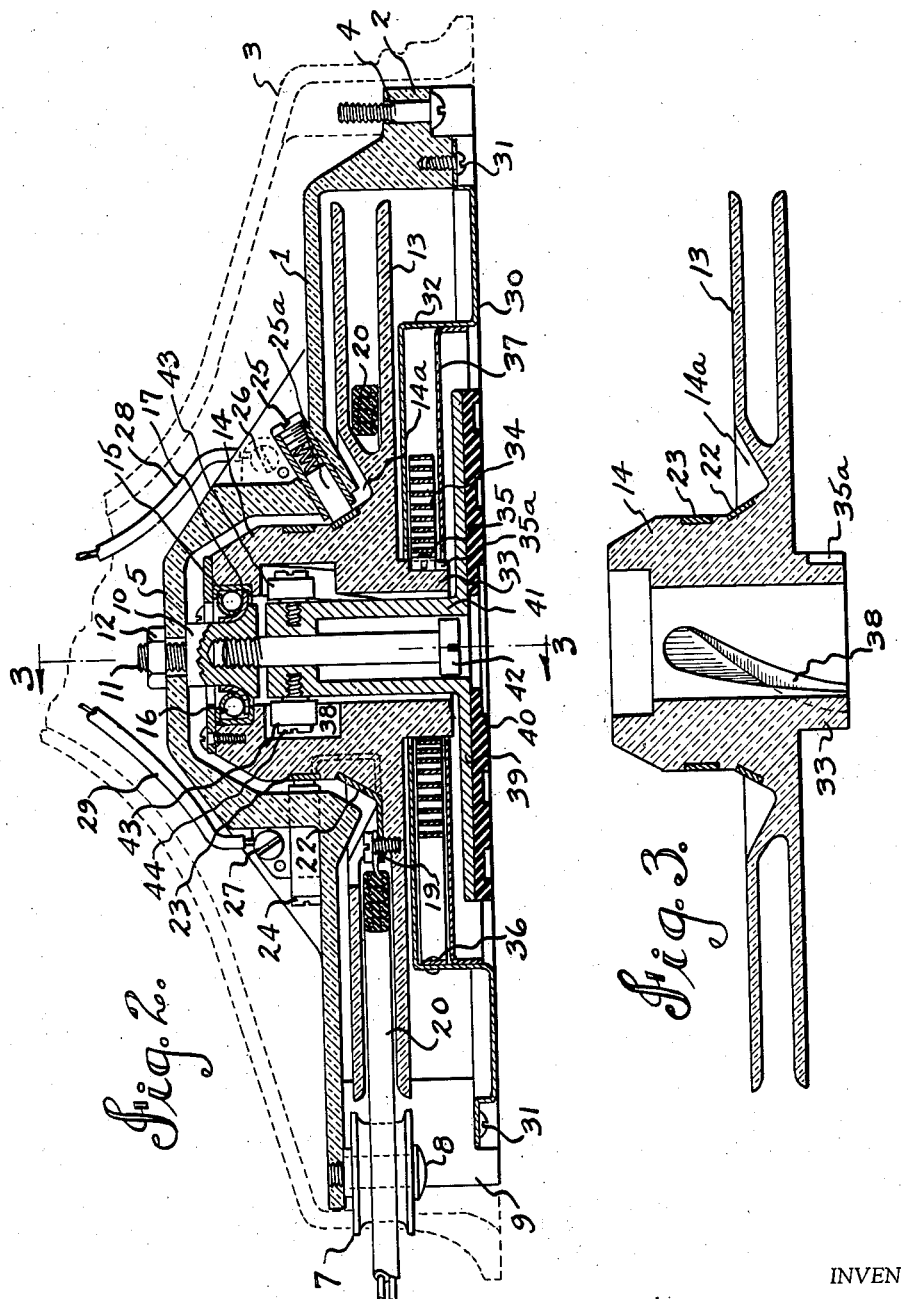

Patented Nov. 5, 1935

2,019,989

UNITED STATES PATENT OFFICE 2,019,989

CORD TAKE-UP AND CONTROL APPARATUS

Henry W. Merkel, Cincinnati, Ohio

Application August 2, 1933, Serial No. 683,326

14 Claims. (Cl. 242—107)

My invention relates to apparatus which is provided in conjunction with electrical appliances, for disposal of the connecting cord for the appliance. Such appliances for example, are electric fans, electric lamps, electric heating or cooking devices, small electrically-driven machines of various kinds or any of the great variety of electrical devices of the kind provided with a suitable base so that the device may be set down on a floor, table or like surface, and with a flexible cord containing the electrical conductors, which cord is provided with a means for connecting it to a source of current supply, usually a wall socket or the like.

An inconvenience in the use of such devices is the handling and disposal of the flexible cord which usually is made of ample length so that the appliance may be connected to a current source a considerable distance from where the appliance is being used. The cord as usually provided is liable to become tangled, and usually has considerable slack and forms in a series of loops and lies exposed, so that it is often in the way of other objects and is exposed to damage and creates an unsafe condition in the use of the appliance. To overcome these difficulties, devices have been provided for such appliances which wind up the cord into a part of the appliance, and it is upon this kind of apparatus especially that my invention is an improvement.

An object of my invention is to provide an especially strong, compact, simple and reliable combination of parts in a device of this character. A further object is to provide for holding the flexible cord in extended condition for use by means which will not require the especial attention of the user, and which means will automatically act to maintain the cord in extended condition, or allow the cord to be controlled incidental to the mere setting down or picking up of the appliance.

A further object in conjunction with the attainment of the objects just mentioned, is to effect a slight additional extension of the cord preliminary to the final holding action incidental to setting the appliance down, so that the cord will have a desired degree of slackness to avoid strain on the cord, which is likely to impair its connections or its insulating covering where it passes over objects or out of its connecting device, and to have this operation automatically effected without especial attention of the user. Another object is, when the apparatus is used with the appliance resting on a floor, to cause the cord to lie flat on the floor and not be either under tension or raised above the floor, avoiding the danger of catching the cord by a person's foot, or the like; also to provide protection against injury to life or limb and against damage to the appliance by accidental or premeditated pulling on the flexible cord by a controlled yielding of the cord to the pull.

A further object of my invention is to have the apparatus self contained, and as a unit, applicable to or removable from the appliance with which it is to be used; and preferably of such relatively small and compact construction that it may readily be contained in a usual form of base of such appliances.

Other objects will appear in the course of the following description illustrated by the accompanying drawings, in which Figure 1 is a plan view of a device embodying a preferred example of my invention.

Fig. 2 is a vertical cross-section on the line 2—2 of Figure 1, and

Fig. 3 is a section of the reel on the vertical plane of the line 3—3 of Fig. 2.

Figure 1:
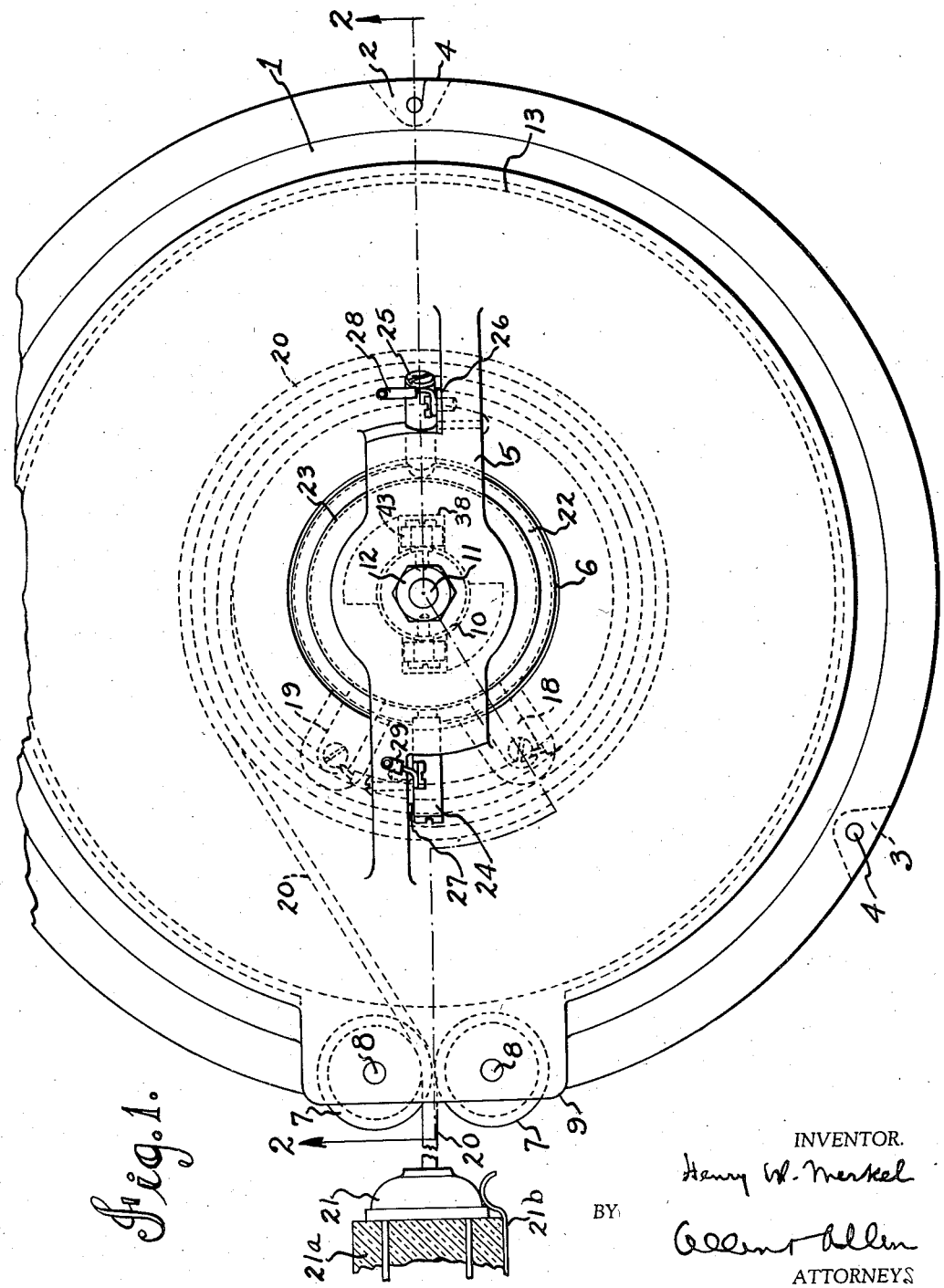

In the preferred construction of my invention as shown herein, the housing 1 is of inverted circular pan shape having on the rim or lower edge, a flange 2 outwardly extending with downwardly opening recesses. The apparatus is mounted inside the base 3 of the appliance, which base is illustrated by dotted lines in Fig. 2; and screws 4 pass up through the flange 2 into suitable bosses inside the base 3 with their heads occupying the recesses of the flange 2.

This housing 1 has centrally an upstanding arch-shaped part 5 across a central opening 6. At one side the housing 1 has a pair of rollers 7 journaled on vertical studs 8 depending from the top of the housing in an opening 9 in one side of the housing. These rollers are flanged and so spaced as to allow a flexible cord to pass easily between them.

The hanger 10 has a stud 11 passing up through an opening in the middle of the centrally located arch 5 with a nut 12 on the upper end of the stud, by which the hanger 10 is clamped tightly to the arch 5. This hanger 10 is enlarged at its lower end and serves to support the reel 13, which has its hub 14 extending up into the arch 5 around this hanger 10 with an end opening around the hanger. A cap ring 15 is screwed on to the top of the hub and extending in over the end opening against the top of a radial and end-thrust ball bearing 16, which bears on the enlarged lower part 17 of the hanger 10.

The reel 13 as well as the housing 1 are preferably made entirely of insulating material, for example, bakelite. The reel 13 is made with a narrow deep annular space to receive the flexible cord in a single series of convolutions; and around the base of its hub 14, has a depression or groove 14a with spaced recesses in its outer sides in communication with the reel space and in which the terminals 18 and 19 for the conductors contained within the flexible cord 20 are mounted to extend across the groove to the hub 14. The outer end of the cord 20 as shown in Figure 1, is provided with the usual form of pronged cap 21, the prongs to enter recesses in a connection socket 21a, preferably having a spring detent 21b for the cap. The terminals 18 and 19 are connected respectively to contact rings 22 and 23 surrounding the hub 14, one above the other. At each side of the arch 5 is an extending rib, and adjacent to these ribs are openings through the adjacent base portions of the arch with tubular casings admitting brushes 24 and 25 respectively which are thus held on the housing and are spring pressed as by the spring 25a in the casings, as seen in Figure 2, against the respective contact rings 22 and 23. On the respective ribs are connections 26 and 27 to the brushes 24 and 25, provided with means for clamping the ends of the cords 28 and 29 respectively of the appliance, not shown, and understood to be any of the kinds of electrical appliances requiring flexible cord connections.

The lower edge or rim of the housing 1 has the bottom plate 30 secured to it by screws 31 and is formed with a central inverted pan-shaped portion 32 with a central opening down through which projects a depending bottom part 33 of the hub 14 of the reel 13. Within this portion 32 of the bottom plate is the flat spiral or clock spring 34, having one end 35 bent to enter a slot 35a opening from the lower end of the hub-depending part 33, and at its other end the permanent connections 36 on the wall of the bottom plate portion 32. Inserted in and fixed in this portion 32 under the spring 34 is a closure 37.

The bottom plate 30 may be loosened by removing the screws 31, upon which it may be rotated relatively to the reel 13, to wind up the spring 34 to any desired degree, according to the force with which it is desired the spring 34 shall act, on the reel 13, to any point at which the plate and housing screw holes register, for reinserting the screws 31. Also, the plate 30 with the spring 34 may be removed as a unit from the housing 1, when screws 31 and stud 42 are removed; the spring 34 slipping out of the reel hub slot 35a, or entering it easily when the unit is to be restored to the housing. If the entire device requires removal from the appliance, this is very easily done by removing the screws 4; and this affords free access to the entire upper part of the apparatus. The entire reel may be removed by simply unscrewing the nut 12 from the stud 11 at the top, allowing the hanger 10 and ball bearing to come out with the reel.

The hub 14 of the reel 13 is hollow from top to bottom and extending from the upper portion of its hollow interior down therealong and out through the bottom thereof are opposite helical slots 38 of high pitch. The clutch member 39 comprises a lower wide flat disc-shaped part on the lower face of which is secured a facing of suitable friction material, as for instance rubber. This member also comprises a hub portion 41 extending up centrally from the wide lower portion 39. This hub occupies the hollow interior of the hub 14 of the reel, and it also is hollow in its lower portion and has extending up through it a stud 42, so that its upper end portion bears pivotally on this stud while the head of the stud 42 has a loose fit in the lower portion of the interior of this hub 41. The upper end of the stud 42 is screwed tightly into the bottom of the hanger 10 before described. By this means the member 39 is slidable up and down within the reel hub and also may be rotated therein. At opposite sides of its upper end portion rollers 43 are journaled on studs 44 screwed into this hub 41; and these rollers 43 bear snugly in the respective helical slots 38 in the interior walls of the reel hub 14.

In the use of the device, the cord 20 may be pulled out therefrom, rotating the reel 13. The spring 34 is so arranged that it yieldingly resists this extending of the cord 20, and if unrestrained will immediately rewind the cord into the apparatus. It will be readily understood that the brushes 24 and 25 bearing on the rings 22 and 23, will maintain electrical connection of the conductors in the cord 20, with the conductors 28 and 29 of the appliance, throughout the revolution of the reel 13 and at any angular position at which the reel may be stopped. The bearings formed by the balls 16 afford the reel a very free rotation, and it is unnecessary for the spring 34 to be very powerful in order to act as above described. The result is that the cord may be very easily withdrawn yet will be retracted fully at any time the reel is free to be rotated by the spring 34.

Connection of the appliance to the source of current may be made for example, by first inserting the pronged cap 21 in the wall socket not shown, and then carrying the appliance away from the socket unwinding the cord 20. Or the appliance may remain stationary and the user may pull the cord out therefrom and insert the pronged cap in the wall socket. In either case without special provision, the spring 34 continues to exert tension on the cord 20 with the objectionable conditions hereinbefore mentioned. This may be overcome by any suitable holding device which would prevent the reel from being turned by the spring; but if such a device were made so as to require the attention of the user to set the reel to provide slack for the cord, this would hardly ever be done, as most users would not remember to set the holding device.

It is to avoid these disadvantages that I provide the member 39 which is a holding or control member such that it not only will restrain the reel and avoid exerting a constant tension on the cord when the cord is extended and connected, but will incident to the act of setting the appliance down on a floor, table or like surface, act to slacken the cord as before referred to. This is due to the provision of the control member 39, so that it may slide up and down, and of the helical slots 38 in the reel hub with the rollers 43 of the control member bearing therein; the slots being so directed that with the control member 39 projecting down past the bottom of the apparatus, it will upon contact with the floor or table surface, have the rest of the apparatus moved down relatively to it so that there is a relatively upward travel of the member 39 with the rollers 43 and slots 38 coacting to give a partial turn of the reel 13. The direction of these slots is such that this turn is in direction to unwind the cord 20 and give it the desired slack. Then when the appliance has been fully set down upon the surface, the control member 39 continues to bear on the surface and by the friction of its facing 40 with the surface, is held from turning, and by engagement of the rollers 43 in the slots 38 prevents rotation of the reel in direction to wind up the cord 20, as it otherwise would tend to do under action of the spring 34.

It will be seen that these provisions add to the safety of use of appliances with extended conductors because regardless of the attention of the user, sufficient slack is provided in the conductor at any time. For instance, if the appliance rested on the floor the slack would cause the conductor to lie flat on the floor. The device is generally of convenient and safe construction because of its compactness and lightness, while at the same time having ample rigidity and bearing for the electrical connections with especially effective insulation of these. The general design of the apparatus being such as to conform to the usual design of appliance base as the base 3 of Fig. 2, is permitted to be of ample dimensions yet without necessity of materially adding to the size of the appliance base. It will be seen that the direction of the helical slots 38 is such that when the appliance is at rest on a floor or other surface, pulling or extending the cord 20 and consequently rotating the reel 13, raises or lifts the control member 39 and its friction facing 40 from contact with the floor, table or other surface, permitting the rotation of reel 13, and the pulling out or extending of the cord 20 without upsetting or deranging the position of the appliance. This unique principle prevents damage to the appliance or injury to life and limb due to the quite frequent accidental catching of feet or furniture in the extension cord 20, at any point between the appliance and attachment plug 21.

It will also be seen that this same direction of the helical slots 38 when the appliance is at rest on a floor or other surface and the cord 20 is accidentally or purposely pulled or extended and when released, the spring 34 immediately tends to wind up cord 20 by rotating reel 13 in the opposite direction, which rotation forcibly lowers or depresses the control member 39 and thrusts its friction facing 40 against the floor, table or other surface effectually preventing rotation of the reel and involuntary winding or snapping up of the cord 20 with consequent strain and damage to the retention cord and the entire reel mechanism. The cord 20 remains in its purposely or accidentally extended position until the appliance is lifted manually and designedly, the lifting of appliance leaving the control member and reel free to be rotated by the spring 34, winding up the cord 20 in reel 13.

I have described my invention especially as used for handling and control of flexible electrical conductors, and this is probably its most useful application. However, it will be seen that it would be useful in similar control of any flexible element used under similar conditions. Also the construction of the apparatus may vary in accordance with different requirements either for electrical appliances or any other purpose, where the apparatus might be similarly used. Therefore while I have rather specifically described and illustrated a certain preferred example of my invention, it will be understood that I am not limited to such precise disclosure, but what I claim as new and desire to secure by Letter Patent is:

1. In apparatus of the character described, comprising a support, a conductor element extensible from said support, and means on said support yieldingly acting on said element to retract it to the support, a holding device operatively related to said element, set to resist the retracting action of said means on said element by pressure of the holding device against a surface supporting the apparatus, but to permit extension of said element by a pull thereon.

2. In apparatus of the character described, comprising a support, a conductor element extensible from said support, and means on said support yieldingly acting on said element to retract it to the support, a movable holding device operatively related to said element, adapted to have its movement resisted to prevent the retraction of said element by pressure of the holding device against a surface supporting the apparatus or to be released to allow said retraction upon relief from said pressure.

3. In apparatus of the character described, comprising a support, a conductor element extensible from said support, and means on said support yieldingly acting on said element to retract it to the support, a holding device operatively related to said element, comprising a rotatable member exposed at the bottom of the apparatus, prevented from rotation by frictional contact with a surface on which the apparatus rests, so as to resist retraction of said element.

4. In apparatus of the character described, comprising a support, a reel rotatably mounted on said support, a flexible element connected to said reel, means connected to said support and said reel yieldingly acting to cause rotation of said reel to wind said element thereon, a holding device comprising a member rotatable with said reel and exposed at the bottom of the apparatus to contact with a surface on which the apparatus rests, so as to resist rotation of the reel.

5. In apparatus of the character described comprising a connecting cord, a spring reel for the connecting cord, and means connected to the reel and in normal position resting on the surface on which the apparatus rests to restrain the reel, said means having a connection with the reel comprising engaging surfaces so relatively shaped that it is moved upwardly out of retaining contact with said surface by a pull on said cord.

6. In apparatus of the character described, comprising a support, a conductor element extensible from said support, and means on said support yieldingly acting on said element to retract it to the support, a holding device, and an operative connection from said holding device to said means, permitting said holding device to retentively engage a surface upon which the apparatus rests, to resist retraction of said element by said means, said operative connection comprising means whereby said holding device is released from said surface by a pull on said element, permitting said element to be withdrawn from said support freely enough to avoid undesirable displacement of the apparatus by the pull on the conductor element, for the purposes set forth.

7. In apparatus of the character described, comprising a support, a reel rotatably mounted on said support, having a hollow hub, a flexible element connected to said reel, means connected to said support and said reel yieldingly acting to cause rotation of said reel to wind said element thereon, a member rotatable in said hollow hub, having a part exposed whereby it is moved axially of said hub in one direction or the other by different bodily movements of the apparatus, the interior of the hub and an adjacent portion of said member having mutually engaging means, one of which is disposed helically in a direction to impart a partial element-unwinding rotation to the reel when the member moves in one direction, said means then resisting element-winding rotation of the reel, said mutually engaging means having a range of relative movement permitting a movement of said member in said one direction responsive to a pull on said flexible element in unwinding direction while the support is bearing the weight of the apparatus, to permit element-unwinding rotation of the reel.

8. In apparatus of the character described, comprising a support, a reel rotatably mounted on said support, a flexible element connected to said reel, means connected to said support and said reel yieldingly acting to cause rotation of said reel to wind said element thereon, a holding device comprising a member movable axially of the reel in one direction under the weight of the apparatus and movable axially thereof in the other direction upon relief from said weight, and means whereby the axial movement in one direction causes a partial element-unwinding rotation of said reel, said means then preventing element-winding rotation of the reel.

9. In apparatus of the character described, comprising a support, a reel rotatably mounted on said support, having a hollow hub, a flexible element connected to said reel, means connected to said support and said reel yieldingly acting to cause rotation of said reel to wind said element thereon, a member rotatable in said hollow hub, having a part exposed whereby it is moved axially of said hub in one direction or the other by different bodily movements of the apparatus, the interior of the hub and an adjacent portion of said member having mutually engaging means, one of which is disposed helically in a direction to impart a partial element-unwinding rotation to the reel when the member moves in one direction, said means then resisting element-winding rotation of the reel.

10. In apparatus of the character described, comprising a support, a reel rotatably mounted on an upright axis on said support, having a hollow hub open at its bottom, a flexible element connected to said reel, means connected to said support and said reel yieldingly acting to cause rotation of said reel to wind said element thereon, a member rotatable in said hollow hub, having a part exposed at the open bottom thereof to engage a surface onto which the apparatus is being lowered, thereby to be raised in said hub, the interior of the hub and an adjacent portion of said member having mutually engaging means, one of which is disposed helically in a direction to impart a partial element-unwinding rotation of the reel when said member is raised, said member then, by its contact with said surface and said mutually engaging means, then resisting element-winding rotation of said reel.

11. In apparatus of the character described, comprising a support, a reel rotatably mounted on an upright axis on said support, having a hollow hub open at its bottom, a flexible element connected to said reel, means connected to said support and said reel yieldingly acting to cause rotation of said reel to wind said element thereon, a member rotatable in said hollow hub, having a part exposed at the open bottom thereof to engage a surface onto which the apparatus is being lowered, thereby to be raised in said hub, the interior of the hub and an adjacent portion of said member having mutually engaging means, one of which is disposed helically in direction to impart a partial element-unwinding rotation of the reel when said member is raised, said member where it is exposed at the bottom of said hub being of widened formation with a flat frictional lower face to contact with said surface, the contact of said face and said mutually engaging means then resisting element-winding rotation of said reel.

12. In apparatus of the character described, a support comprising an open-bottomed casing with an open-bottomed raised central top portion, a reel in said casing having a hub extending up into said central portion, bearing means at the top of said hub, on the top of said central portion, suspending said reel for rotation, means connected to said support and said reel yieldingly acting to cause rotation of said reel, a flexible element extensible out of said casing and wound onto said reel by said rotation whereby it is retracted into said casing, said hub having a hollow interior open at its bottom, a control member comprising a wide portion below said reel hub, with a bottom face for contact with a surface onto which the apparatus is lowered, and having an upstanding hub portion within said reel hub, said control member being movable upwardly incident to said contact and said reel hub interior and said member hub portion having means coacting incident to the upward movement of said hub to control the angular position of the reel.

13. In apparatus of the character described, a support comprising an open-bottomed casing with an open-bottomed raised central top portion, a reel in said casing having a hub extending up into said central portion, bearing means at the top of said hub, on the top of said central portion, suspending said reel for rotation, said hub having an extension at the bottom of said reel, a spiral spring around said extension with one end connected thereto and its other end connected to said casing, a flexible element extensible from said casing and wound onto said reel by said rotation whereby it is retracted into said casing, said hub having a hollow interior open through its bottom extension, and a control member comprising a wide portion below said hub extension and spring and an upstanding hub portion within said reel hub, and means whereby said member hub portion and said reel hub coact to control the angular position of the reel.

14. In apparatus of the character described, comprising a support, a conductor element extensible from said support, and means on said support yieldingly acting on said element to retract it to the support, a holding device operatively related to said element to move therewith if unrestrained, or to prevent retracting action of said element if restrained, said holding device having a part engageable exteriorly of the apparatus by means extraneous to the apparatus, and acting, under the weight of the apparatus when the apparatus is moved as a unit, to alter the degree of restraint of said holding device, whereby the conductor element is freely withdrawable from the apparatus during movement thereof as a unit and is free of retraction to said apparatus when the apparatus is in normal stationary condition, the maximum degree of restraint of said holding means being such that the conductor element is withdrawable from the apparatus in response to a pull on the conductor element while the apparatus is in said normal stationary condition.

HENRY W. MERKEL.